(12) United States Patent
Zhu et al.

(10) Patent No.: US 7,594,275 B2
(45) Date of Patent: Sep. 22, 2009

(54) DIGITAL RIGHTS MANAGEMENT SYSTEM

(75) Inventors: Bin Zhu, Edina, MN (US); Guofei Gu, Atlanta, GA (US); Shipeng Li, Irvine, CA (US)

(73) Assignee: Microsoft Corporation, Redmond, WA (US)

( * ) Notice: Subject to any disclaimer, the term of this patent is extended or adjusted under 35 U.S.C. 154(b) by 608 days.

(21) Appl. No.: 10/685,234

(22) Filed: Oct. 14, 2003

(65) Prior Publication Data

US 2005/0080746 A1    Apr. 14, 2005

(51) Int. Cl.
G06F 7/04 (2006.01)
H04N 7/16 (2006.01)

(52) U.S. Cl. .................................. 726/26; 713/180
(58) Field of Classification Search ............... 726/26; 713/180
See application file for complete search history.

(56) References Cited

U.S. PATENT DOCUMENTS

| | | | |
|---|---|---|---|
| 5,543,856 A | 8/1996 | Rosser et al. | |
| 6,163,841 A * | 12/2000 | Venkatesan et al. | 713/176 |
| 6,209,091 B1 * | 3/2001 | Sudia et al. | 713/156 |
| 6,226,618 B1 * | 5/2001 | Downs et al. | 705/1 |
| 6,742,114 B1 * | 5/2004 | Carter et al. | 713/156 |
| 6,873,975 B1 * | 3/2005 | Hatakeyama et al. | 713/193 |
| 2002/0013772 A1 | 1/2002 | Peinado | |
| 2002/0109707 A1 * | 8/2002 | Lao et al. | 345/700 |
| 2002/0120675 A1 | 8/2002 | Everett et al. | |
| 2004/0073790 A1 * | 4/2004 | Ateniese et al. | 713/165 |
| 2004/0133794 A1 * | 7/2004 | Kocher et al. | 713/193 |

FOREIGN PATENT DOCUMENTS

| | | |
|---|---|---|
| RU | 2144279(C1) | 1/2000 |
| RU | 2189119(C2) | 9/2002 |
| WO | WO0146782 | 6/2001 |
| WO | WO0223315 | 3/2002 |

OTHER PUBLICATIONS

Schneier, "Applied Cryptography," 1996, pp. 183-184.*
Stadler, "Publicly Verifiable Secret Sharing," Advances in Cryptology—EUROCRYPT '96, pp. 190-199, 1996.*
Desmedt, "Some Recent Research Aspects of Threshold Crytography," 1997.*
Shoup, "Practical Threshold Signatures," 2000.*
Desmedt, "Threshold Cryptosystems", International Association for Cryptologic Research: Advances in Cryptology—Auscrypt, Gold Coast, Queensland, Dec. 13-16, 1992, Proceedings of the Workshop on the Theory and Application of Cryptographic Techniques, Berlin, Springer, DE, vol. CONF. 3, pp. 1, 4-14.
Feldman, "A Practical Scheme for Non-interactive Verifiable Secret Sharing", Institute of Electrical and Electronics Engineers: Annual Symposium on Foundations of Computer Science. Los Angeles, Oct. 12-14, 1987, Washington, IEEE Comp. Soc. Press, US, vol. SYMP. 28, pp. 427-437.
Hwang et al., "An on-line secret sharing scheme for multi-secrets", Computer Communications, Butterworths & Co. Publishers LTD, GB, vol. 21, No. 13, Sep. 1, 1998, pp. 1170-1176.

(Continued)

Primary Examiner—Kambiz Zand
Assistant Examiner—William S Powers
(74) Attorney, Agent, or Firm—Lee & Hayes, PLLC

(57) ABSTRACT

A public licensing infrastructure (PLI) for a digital rights management (DRM) system is described. In an implementation, a method includes generating a formal license for content. The formal license includes a decryption key for decrypting the content and access rules for accessing the content. A plurality of license authorities is configured to provide a plurality of partial licenses. The plurality of partial licenses is combinable to form the formal license. Each license authority provides a respective partial license.

17 Claims, 9 Drawing Sheets

OTHER PUBLICATIONS

Stadler, "Publicly Verifiable Secret Sharing", International Conference on the Theory and Application of Crytography Techniques, Saragossa, May 12-16, 1996, Advances in Cryptography—Eurocrypt, pp. 190-199.

European Search Report mailed Feb. 27, 2006.

Khalili; Notes on verifiable secret sharing schemes (VSS); Nov. 27, 2002; pp. 1-6.

"Verifiable Secret Redistribution for Threshold Sharing Schemes"; pp. 1-16.

Messerschmitt; "RSA Asymmetric Encryption"; Aug. 18, 1999; University of California; pp. 1-4.

Shamir, "How to Share a Secret", 1979, Massachusetts Institute of Technology, pp. 1-4.

\* cited by examiner

DIGITAL RIGHTS MANAGEMENT SYSTEM

TECHNICAL FIELD

The present invention generally relates to the field of digital rights management and more particularly to a distributed digital rights management system.

BACKGROUND

Users have access to a wide range of content in an ever increasing variety of ways. Wide availability of content, such as software and digital media, and easy access to the content through the Internet has resulted in unintended and unauthorized use of the content. Digital Rights Management (DRM) may be employed to manage rights for content from creation to consumption, and may protect digital content from illegal accesses or copying. Most DRM systems are based on encryption in which the content is encrypted and distributed. Traditionally, a consumer who wants to output the encrypted content must first get permission to access the content and get a decryption key for the encrypted content, which may be provided in the form of an encrypted license. The DRM system enforces the proper usage of the digital content through use of the encrypted license.

In a conventional DRM system, license acquisition requests are processed by a centralized license server. This makes the centralized license server heavy-loaded, complex, and expensive to run and maintain, and makes it a weak link in the DRM system. For example, failure of the centralized license server may disrupt normal DRM services. Additionally, small content providers, such as a peer in a peer-to-peer network, may not be able to afford the cost of providing and/or utilizing the services of the centralized license server.

Peer-to-peer networks have recently attracted increased attention in both academia and business. Peer-to-peer networks offer many desirable features, such as adaptation, self-organization, load-balancing, fault-tolerance, low cost, high availability, scalability, and may be configured to provide a large pool of resources. Peer-to-peer networks have emerged as a popular way to share large amounts of data, such as by peers downloading songs that are referenced as being available for download through a peer-to-peer website. Most peer-to-peer networks, however, do not have digital rights management or access control. Consequently, peer-to-peer networks can be liable for contributing to the infringement of the copyright in works that are referenced as being available for download by the peer-to-peer networks.

Accordingly, there is a continuing need for a distributed public licensing infrastructure for digital rights management systems.

SUMMARY

A public licensing infrastructure (PLI) for a digital rights management (DRM) system is described. The DRM system provides for protection of content, such as songs, images, documents, digital multimedia, software, and so on. The DRM system may be provided through a distributed PLI in which a plurality of partial licenses is provided by a plurality of license authorities. The license authorities are communicatively coupled over a network. The partial licenses are combinable to form a formal license that may be utilized to output the content.

A (k, m) threshold secret sharing scheme may be employed such that any k partial licenses of an m plurality of partial licenses may be utilized to form the formal license. Through implementation of the (k, m) threshold secret sharing scheme, the DRM system may be fault tolerant such that if a license authority is unavailable to provide a partial license, other license authorities may provide partial licenses to form the formal license. Reliability and intrusion tolerance of the described DRM system may also be enhanced through cryptographic algorithms, such as the Advanced Encryption Standard (AES) and the Rivest, Shamir, & Adleman (RSA) to provide robust content protection and to ensure that only the authorized users can access the content. Additionally, the DRM system may be utilized in a peer-to-peer network, and therefore leverage replication and caching mechanisms of the peer-to-peer network while protecting the content from unauthorized access.

In one implementation, a method includes generating a formal license for content. The formal license includes a decryption key for decrypting the content and also includes access rules for accessing the content. A plurality of license authorities is configured to provide a plurality of partial licenses. The partial licenses are combinable to form the formal license. Each license authority provides a respective one or more of the partial licenses.

In another implementation, a method includes obtaining a plurality of partial licenses over a network from a plurality of license authorities. Each of the partial licenses is provided, respectively, by a different one of the license authorities. A formal license is formed from the plurality of partial licenses that includes access rules and a decryption key for accessing content.

DETAILED DESCRIPTION

Overview

A Public Licensing Infrastructure (PLI) is described for digital rights management (DRM) systems. The PLI described herein may be implemented in a decentralized system to provide public license services for consumers in a DRM system. The PLI may serve as an inexpensive license service provider to protect content, and therefore may be utilized by a wide variety of content publishers. For example, authors may provide copies of books, musical groups may provide songs, and so on to consumers in a manner in which the content is protected from unlicensed use. Thus, the DRM system may be useful for small content providers, such as peers in a peer-to-peer network, that cannot afford the conventional server/client based DRM system and traditional distribution channels.

The PLI may include a plurality of license authorities which collectively provide distributed DRM license services for consumers. Each of the license authorities, for example, may provide one or more of a plurality of partial licenses. The plurality of partial licenses may be utilized to form a formal license that is employed by a content player of the consumer to output the content. The plurality of partial licenses may be provided by the license authorities utilizing a threshold secret sharing scheme such that the formal license may be formed from a specified number of the partial licenses, as will be described in greater detail in relation to FIGS. 5-8. Based on PLI and license authorities, the DRM system may provide protection of content and digital rights management for consumers in a peer-to-peer network. Thus, the PLI may leverage functionality of peer-to-peer networks, such as distribution, access, and searching for content, yet still protect the content that is provided in the peer-to-peer network.

Environment

Figure 1:
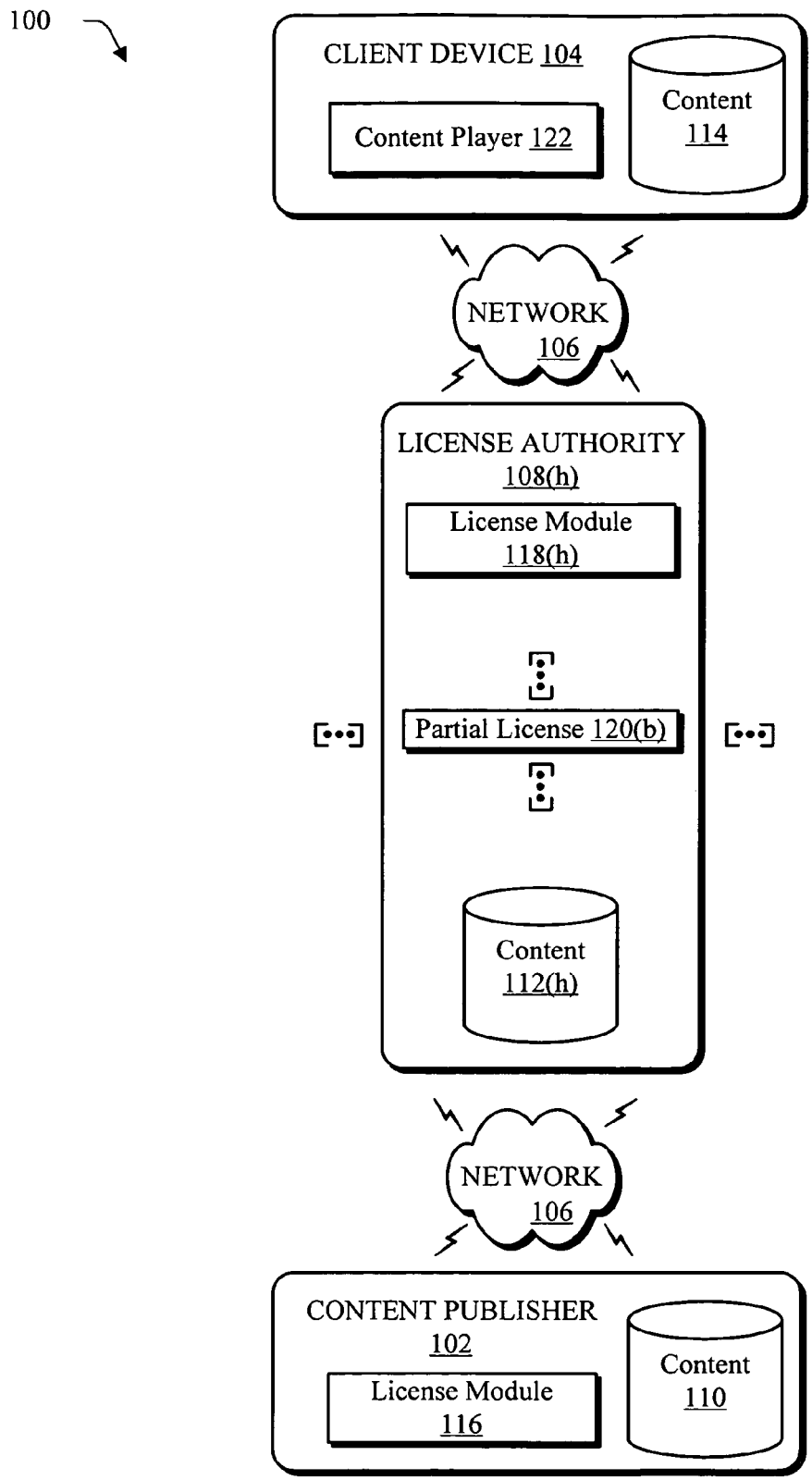
FIG. 1 is an illustration of an exemplary implementation in which a digital rights management (DRM) system is shown that employs a public licensing infrastructure in a peer-to-peer network.

FIG. 1 is an illustration of an exemplary implementation in which a DRM system 100 is shown that employs a PLI in a peer-to-peer network. The DRM system 100 includes a content publisher 102 that is communicatively coupled to a client device 104 over a network 106. A plurality of license authorities 108(h) are also communicatively coupled to the network 106. The client device 104, content publisher 102, and plurality of license authorities 108(h) each represent a node in the network 106. A node may be thought of as a connection point to transmit data, such as a redistribution point that provides data to other nodes and/or an end point that is a destination and/or source of data.

The network 106 is configured as a peer-to-peer network. A peer-to-peer network allows nodes of the network 106 to access shared resources located on each of the nodes, i.e. the client device 104, the content publisher 102, and the plurality of license authorities 108(h). Examples of peer-to-peer networks, have been known and used in the past, include the following:

Freenet, as described by I. Clarke, B. Wiley, O. Sanberg, and T. Hong in "Freenet: A Distributed Anonymous Information Storage and Retrieval System," *Proc. Int. Workshop on Design Issues in Anonymity and Unobservability*, Springer Verlag, LNCS 2009, 2001;

Chord, as described by I. Stoica, R. Morris, D. Karger, M. F. Kaashoek, H. Balakrishnan in "Chord A Scalable Peer-to-peer Lookup Service for Internet Applications," *Proc. ACM SIGCOMM '01*, San Diego, Calif., USA, 2001;

CAN, as described by S. Ratnasany, P. Francis, M. Handley, R. Karp, and S. Shenker in "A Scalable Content-Addressable Network," *Proc. ACM SIGCOMM '01*, San Diego, Calif., USA, 2001;

Pastry, as described by A. Rowstron and P. Druschel in "Pastry: Scalable, Decentralized Object Location and Routing for Large-Scale Peer-to-Peer Systems," *IFIP/ACM Int. Conf. Distributed Systems Platforms (Middleware)*, 2001; and Tapestry, as described by B. Y. Zhao, J. Kubiatowicz, and A. D. Joseph in "Tapestry: An Infrastructure for Fault-tolerant Wide-Area Location and Routing," *Technical Report No. UCB/CSD*-01-1141, Univ. of California, Berkeley.

Peer-to-peer networks may offer a variety of features, such as redundancy and fault tolerance. Content stored in the peer-to-peer network may gradually spread as the content is replicated by nodes of the peer-to-peer network. For example, content 110 may be provided by the content publisher 102 to be shared with other nodes of the network 106, i.e. the client device 104 and the plurality of license authorities 108(h). The content 110 may be accessed by each of the nodes of the network 106 and stored by the respective nodes. For instance, each of the license authorities 108(h) may respectively store content 112(h). Therefore, the client device 104 may access content 112(h) from the plurality of license authorities 108(h) and/or content 110 from the content publisher 102 and/or other nodes in the network 106. The client device 104 may also provide content 114 for distribution over the network 106. For instance, the content 114 may originate from the client device 104 to be distributed across the network. Additionally, the content 114 may be replicated by the client device 104 from content stored by any of the other nodes of the network 106, such as the license authorities 108(h) and/or the content publisher 102. Thus, content may become highly redundant in a peer-to-peer network, which may result in increased reliability and availability of the data. This can effectively reduce the operational cost of providing content by the content publisher 102 and thus may be utilized by a wide variety of users, e.g. a wide variety of content publishers and/or client devices.

The content publisher 102 includes a license module 116 that is executable by the content publisher 102 to provide digital rights management. The license module 116 may be utilized to generate a formal license that corresponds to the content 110 that is published by the content publisher 102 for distribution on the network 106. The formal license enables content that corresponds to the formal license to be accessed. For example, the formal license may include a decryption key and access rules for accessing the content, such as access that is permitted by the content provider and/or access that is available to a consumer.

Each of the license authorities 108(h) also includes a respective license module 118(h), which are also utilized to provide digital rights management in the DRM system 100. For example, the license module 116 of the content publisher 102 may be utilized to provide data to each of the license authorities 108(h) such that each respective license module 118(h) thereof may provide, respectively, one or more partial licenses 120(b). The partial licenses 120(b) may be utilized to form one or more formal licenses that are utilized to provide access to content. A further description of the configuration of license authorities 108(h) to provide partial licenses may be found in relation to FIGS. 3 and 5.

The client device 104 includes a content player 122 to output content, such as content 114 stored on the client device 104, content 112(h) that is obtained from the respective license authorities 108(h), and content 110 that is obtained from the content publisher 102. The content player 122, when executed by the client device 104, may obtain one or more of the partial licenses 120(b) to form a formal license. Through distribution of the provision of the partial licenses in the DRM system 100, a variety of functionality may be provided. For example, the DRM system 100 may be made fault tolerant such that a formal license may be formed even if one or more of the license authorities 108(h) becomes unavailable. Additionally, the DRM system 100 may be intrusion tolerant in that there is no single point of vulnerability to attack to obtain the formal license, as will be described in greater detail in relation to FIG. 7.

Figure 2:
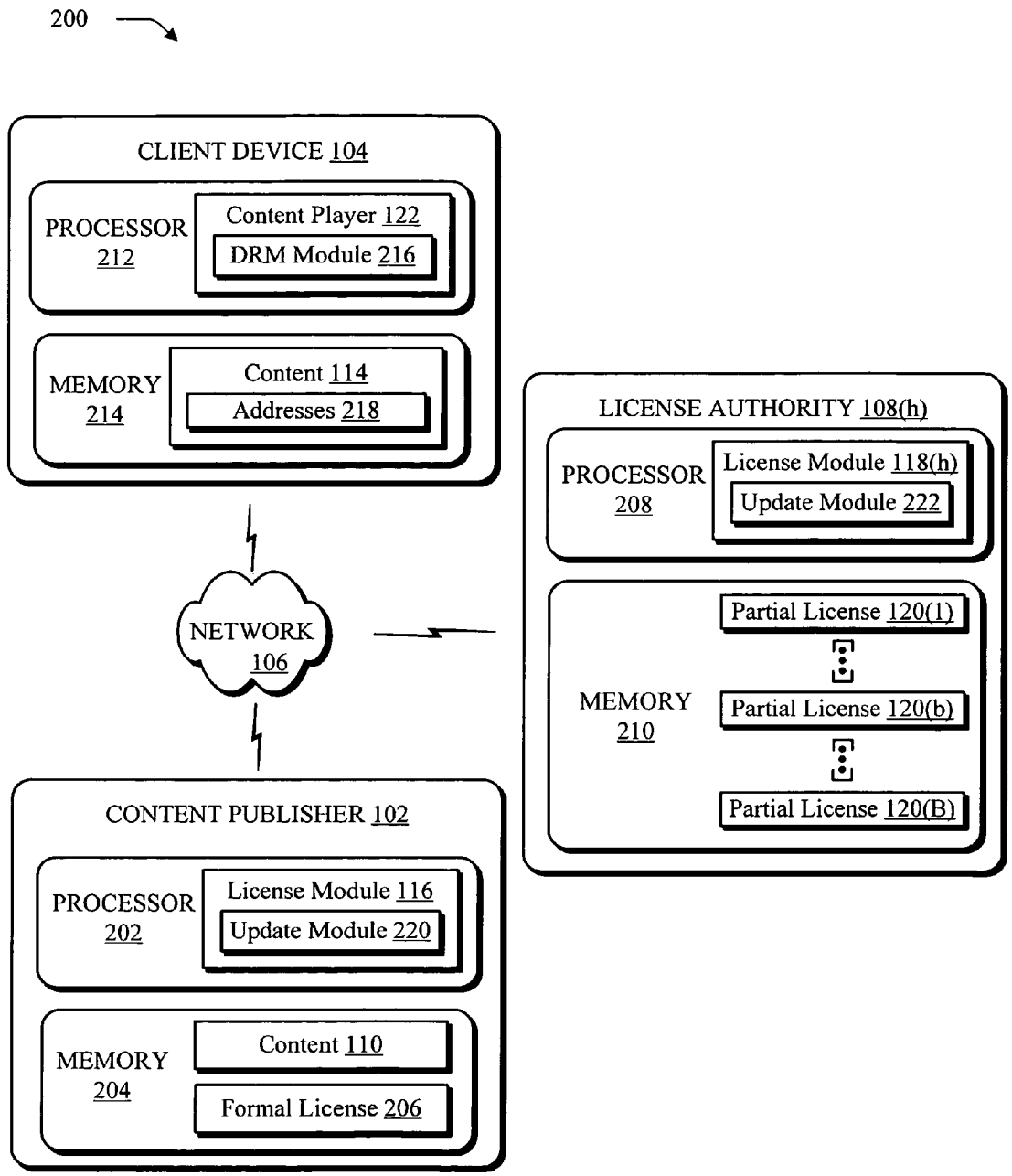
FIG. 2 is an illustration of an exemplary implementation in which a client device, a content publisher, and a license authority from the DRM system of FIG. 1 are shown in greater detail.

FIG. 2 is an illustration of an exemplary implementation in which the client device 104, content publisher 102, and the license authority 108(h) of FIG. 1 are shown in greater detail. The content publisher 102 includes a processor 202 and memory 204. The license module 116 is illustrated as being executed on the processor 202 and is storable in the memory 204. The memory 204 is illustrated as storing content 110 and a formal license 206 that corresponds to the content 110. The formal license 206 supplies information that enables the content 110 to be output, such as a decryption key and access rules. The access rules may specify access rights that the content publisher allows and/or client specific access rules. For example, the content publisher may specify different time durations for accessing content based on different payment amounts. Therefore, the access rules of the consumer may depend on the duration purchased. The formal license 206 may be provided by the content publisher 102 in a variety of ways. For example, the formal license 206 may be automatically generated through execution of the license module 116. Additionally, the formal license 206 may be specified by a developer of the content, such as written by the developer and uploaded to the content publisher 102 along with the content 110.

The license module 116 is executable on the processor 202 of the content publisher 102 to create data that may be utilized by the license module 118(h) of the license authority 108(h) to provide a plurality of partial licenses 120(1)-120(B). In one implementation, the license authority 108(h) is provided with one or more partial licenses 120(1)-120(B) by the content publisher 102, i.e. the data is the actual partial licenses 120(1)-120(B). The partial licenses 120(1)-120(B) are then stored in the memory 210 as illustrated.

In another implementation, the license authority 108(h) is provided with data, from which, the license authority 108(h) may generate one or more of the partial licenses 120(1)-120(B). For example, the license module 118(h) of the license authority 108(h) is illustrated as being executed on a processor 208 and is storable in memory 210. When the license module 118(h) is executed on the processor 208, the license module 118(h) generates one or more of the plurality of partial licenses 120(1)-120(B) in response to a request for the one or more partial licenses 120(1)-120(B). Generation of partial licenses is described in greater detail in relation to FIG. 6.

The client device 104 includes a content player 122 to output content 114. The content player 122 is illustrated as being executed on the processor 212 and is storable in the memory 214. The content player 122, when executed, may output a variety of content, such as songs, movies, pictures, documents, and so on.

The content player 122 is illustrated as including a DRM module 216. The DRM module 216, when executed on the processor 212, forms a formal license from two or more of the plurality of partial licenses 120(b) of FIG. 1. The formal license may then be read by the content player 122 to output the content 114. Formation of the formal license by the DRM module 216 is described in greater detail in relation to FIGS. 4 and 6. The DRM module 216 may be configured as one or more software modules that are secure and tamper-proof. For instance, although the content player 122 may interact with the DRM module 216, the DRM module 216 may not be modified by the content player 122.

To obtain the one or more of the plurality of partial licenses 120(b) of FIG. 1, the content 114 may include the network addresses 218 (addresses) of the license authorities 108(h) which store partial licenses that may be utilized to form the formal license. For example, the content publisher 102 may package content 114 to include the addresses 218 of license authorities 108(h) of FIG. 1 that were provided with partial licenses and/or data to generate partial licenses. The content 114 including the addresses 218 may be distributed over the network 106, and then obtained by the client device 104 as illustrated. To output the content, the content player 122 initiates the DRM module 216 to form the formal license to output the content 114. The DRM module 216 may obtain the addresses 218 of the license authorities 108(h) of FIG. 1 that respectively provide the partial licenses 120(b) from the content 114. Further examples of forming the formal license by the DRM module 216 may be fond in relation to FIGS. 4 and 6.

By distributing the provision of the partial licenses 120(b) of FIG. 1 among the respective license authorities 108(h), the formal license is protected against attack. Given a sufficiently long time, however, an attacker may finally compromise enough of the license authorities 108(h) to form the formal license. To thwart such an attack, the partial licenses 120(b) of FIG. 1 may be updated with a proactive secret sharing scheme through execution of one or more update modules 220, 222. For example, the license authority 108(h) and/or the content publisher 102 may each include one of the update modules 220, 222. The update modules 220, 222 are illustrated as being executed on the respective processors 202, 208 and are storable in the respective memories 204, 210. When executed, the update modules 220, 222 may periodically update the arrangement of the partial licenses 120(b) of FIG. 1 among two or more of the license authorities 108(h). By updating the arrangement, different respective license authorities 108(h) of FIG. 1 may be configured to provide the partial licenses 120(b). Additionally, the partial licenses 120(b) may be further divided and stored on different license authorities 108(h) such that different partial licenses are needed to form the formal license. An attacker, therefore, has to compromise a sufficient number of the license authorities 108(h) to generate the formal license before the partial licenses are updated. Otherwise, the attacker is forced to restart the attacks again. Further discussion of an update scheme may be found in relation to FIGS. 8 and 9.

Generating and Forming a Formal License in a Distributed DRM System

Figure 3:
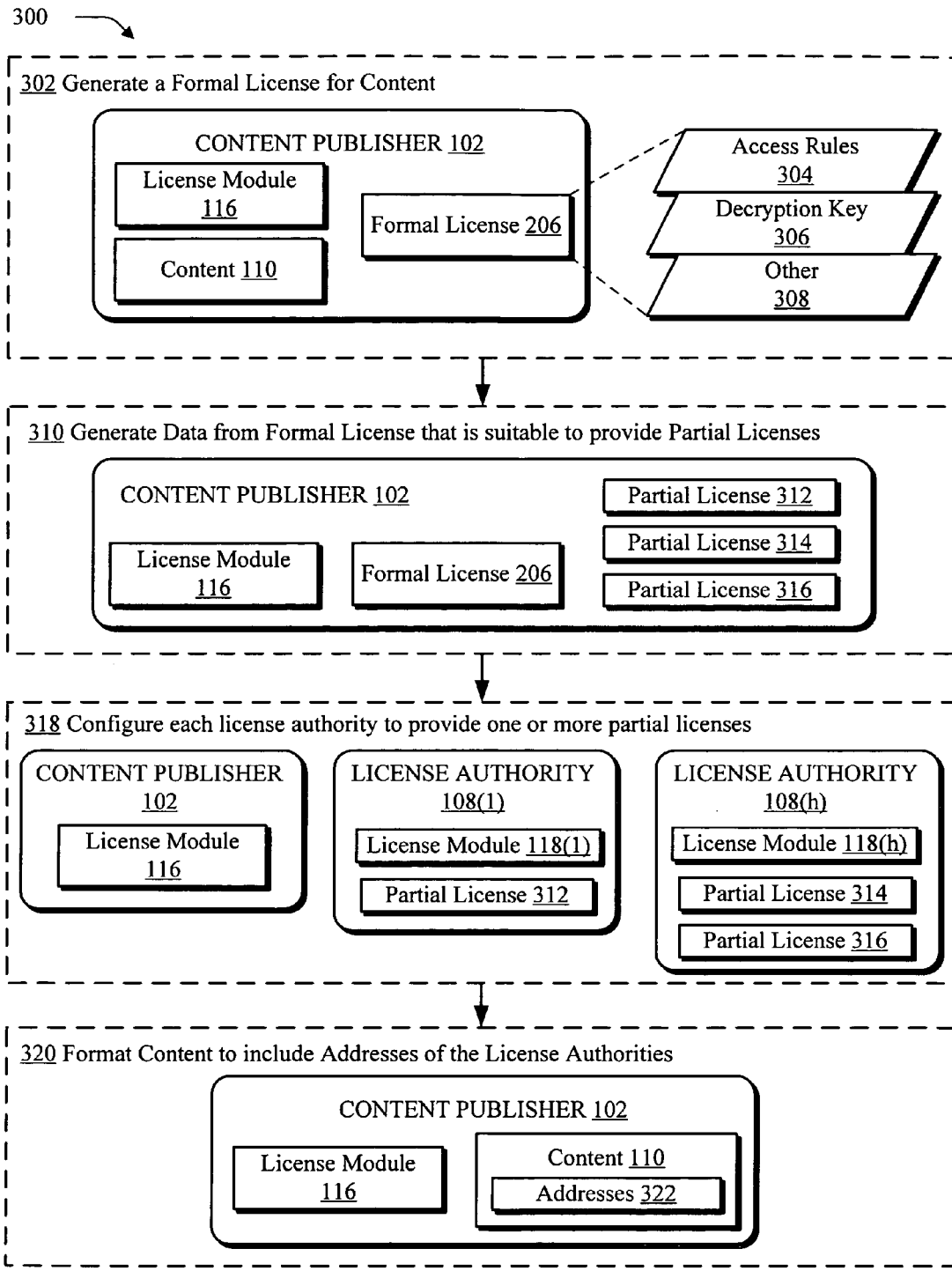
FIG. 3 is a flow chart illustrating a procedure of an exemplary implementation in which a plurality of license authorities in a DRM system are configured to provide partial licenses that may be utilized to form a formal license.

FIG. 3 is a flow chart illustrating a procedure 300 of an exemplary implementation in which a plurality of license authorities in a DRM system are configured to provide partial licenses that may be utilized to form a formal license. At block 302, the formal license 206 is generated for content 110 through execution of the license module 116 on the content publisher 102. The formal license 206 is suitable for being utilized by the client device 104 of FIG. 2 to output the content 110. For example, the formal license 206 may include access rules 304, a decryption key 306, and other 308 information. The access rules 304 may specify rules and rights that a consumer has to access the content 110, and/or rules and rights that the content publisher 104 allows for accessing the content 110. The decryption key 306 may be utilized to decrypt the content 110.

At block 310, data is generated from the formal license that is suitable to provide partial licenses 312, 314, 316. In one implementation, the data is the actual partial licenses 312, 314, 316 that are combinable to form the formal license 206. In another implementation, the data may be utilized by each of the license authorities 108(1), 108(h) to generate the partial licenses 312-316 through execution of the respective license modules 118(1), 118(h).

At block 318, each license authority 108(1), 108(h) is configured to provide one or more of the partial licenses 312-316. For example, the license module 116, when executed by the content publisher may form one or more transmissions that include the data generated at block 310. The license authorities 108(1), 108(h) may utilize the transmissions to generate the respective partial licenses 312-316 by executing the respective license modules 118(1), 118(h). License authority 108(1), for instance, may execute the license module 118(1) to generate the partial license 312 from data received in a transmission from the content publisher 102. Likewise, license authority 108(h) may execute the license module 118(h) to generate partial licenses 314, 316 from data received from the content publisher 102. Thus, the one or more transmissions may be utilized to configure the license authorities 108(1), 108(h) to generate the partial licenses 312-316. The partial licenses 312-316 are combinable to form the formal license 206, which is described in greater detail in relation to FIG. 4.

At block 320, the license module 116 is executed by the content publisher 102 to package the content 110 to include the addresses 322, i.e. network addresses, of where to obtain the partial licenses. For example, the addresses 322 may include one or more network addresses of a proxy that is utilized to locate each of the license authorities 108(1), 108(h). In another implementation, the addresses 322 include the network address that is utilized to locate each of the license authorities 108(1), 108(h). The packaged content may then be distributed utilizing a variety of methods, such as over the network 106 of FIG. 1, on a computer-readable medium, and so on.

Figure 4:
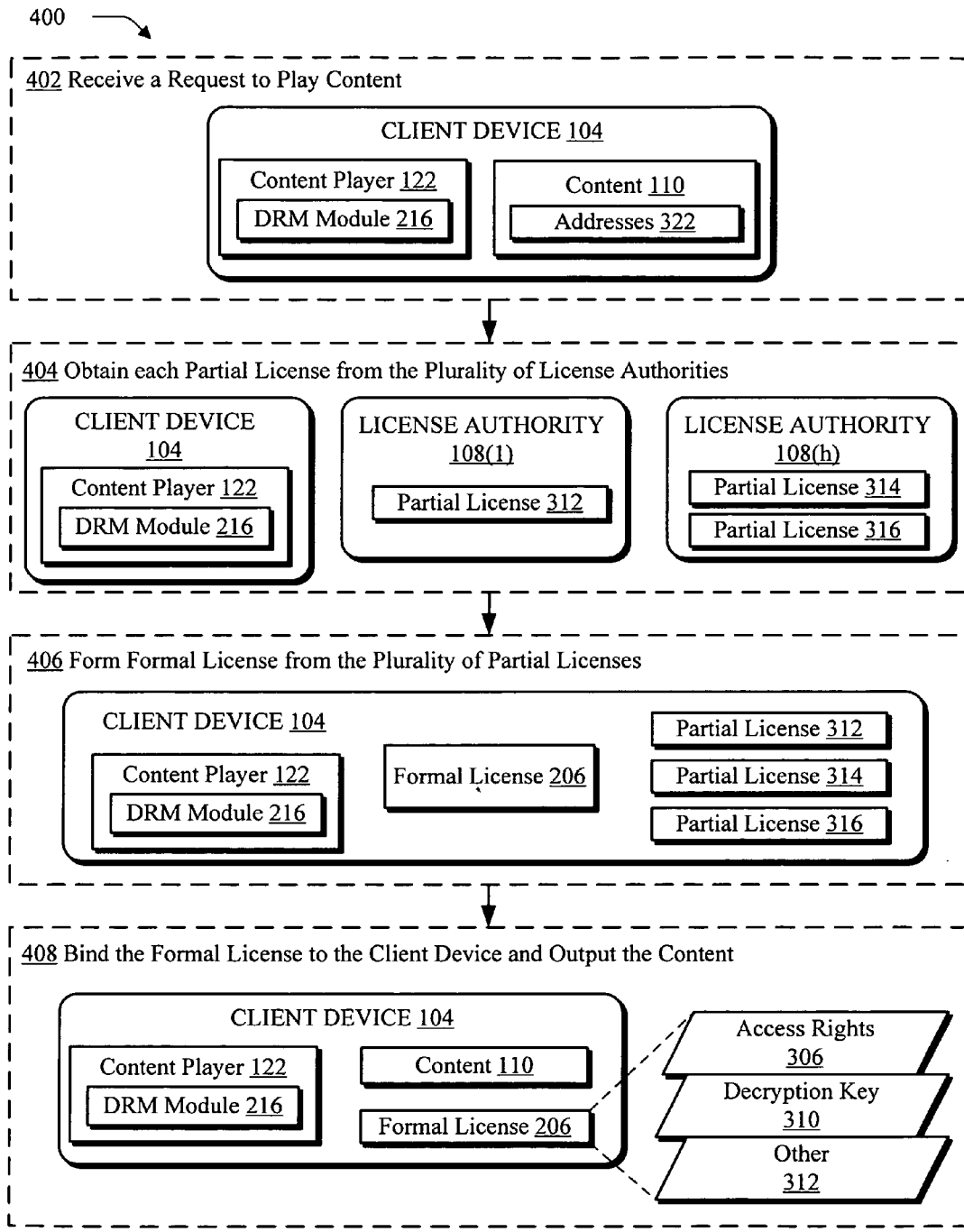
FIG. 4 is a flow chart depicting a procedure of an exemplary implementation in which a formal license is formed from the partial licenses of FIG. 3 to output content.

FIG. 4 is a flow diagram depicting a procedure 400 of an exemplary implementation in which a formal license is formed from the partial licenses 312-316 of FIG. 3 to output content 110. At block 402 a request is received to play the content 110. The content 110, for example, may be received by the client device 104 over the network 106 of FIG. 1 from the content publisher 102. The client device 104 executes the content player 122 to output the content 110, such as to play a song, display a picture, display a movie, and so forth. The content player 122 may provide a user-interface to receive commands from a user, such as to play content, select content, control output of the content (e.g. fast forward, pause, and rewind), and so on.

When the content player 122 receives a request to output the content 110, the DRM module 216 is initiated by the content player 122 to provide access to the content. The DRM module 216 is part of the PLI to provide digital rights management of the content 110. The digital rights of the content 110 are supplied in the formal license 206 of FIG. 3. Therefore, to provide access to the content 110, the DRM module 216, when executed by the client device 104, forms the formal license so that the content player 122 may output the content 110.

At block 404, for example, the DRM module 216 is executed by the client device to obtain the partial licenses 312-316 from the plurality of license authorities 108(1), 108(h). The DRM module 216, for instance, may first examine the content 110 to find the addresses 322 of license authorities 108(1), 108(h) that provide the partial licenses 312-316. The DRM module 216 may then request that each of the license authorities 108(1), 108(h) provide the respective partial licenses 312-316. The partial licenses 312-316 may be provided by the respective license authorities 108(1), 108(h) in a variety of ways. For example, license authority 108(1) may store the partial license 314 and provide the partial license 314 when requested. In another example, license authority 108(h) may generate partial licenses 316, 318 from data that was provided to the license authority 108(h) at block 318 of FIG. 3.

At block 406, the DRM module 216 is executed to form the formal license 206 from the plurality of partial licenses 312-316. The formal license 206 may be formed by the DRM module 216 by combining the plurality of partial licenses 312-316. In one implementation, each partial license 312-316 provides a portion of the formal license 206. In another implementation, each partial license may be supplied through use of a (k, m) threshold secret sharing scheme that is used to divide and recover the formal license 206. Utilizing the (k, m) threshold secret sharing scheme, even though k partial licenses are combinable to form the formal license, the partial licenses do not reveal information regarding the formal license even when k−1 or fewer partial licenses are combined. At block 408, the formal license is bound to the client device such that the formal license may be utilized by that client device 104 alone. Therefore, the formal license is further protected against unauthorized formation as will be described in greater detail in relation to FIGS. 5-7.

As illustrated in FIGS. 3 and 4, there are many communication sessions between the client device 104, the license authorities 108(1), 108(h) and the content publisher 102. To protect the security of the communications, a Secure Sockets Layer (SSL) may be used to ensure communication security. Additionally, the license authorities 108(1), 108(h) may also utilize certificates to protect the license authorities 108(h) from being impersonated by attackers. The certificate, for instance, may be utilized to verify credentials of the license authorities 108(1), 108(h), such as through use of an identifier (ID) of the license authority, a digital signature of the certificate-issuing authority, and so on.

Exemplary Implementation using a (k, m) Threshold Secret Sharing Scheme

In the previous implementations, partial licenses were obtained from a distributed digital rights management (DRM) system. The partial licenses were utilized to form the formal license to provide a consumer with access to protected content, i.e. content that is encrypted and/or having access rights which are specified in a formal license. To further increase the efficiency and fault tolerance of the DRM system, a (k, m) threshold secret sharing scheme may be employed to distribute and form the partial licenses.

In an implementation, a DRM system employs a (k, m) threshold secret sharing scheme in which the formal license is divided into m partial licenses. The formal license is divided such that knowledge of any k or more partial licenses may be utilized to form the formal license. Additionally, knowledge of any k−1 or fewer partial licenses may not be utilized to form information included in the formal license, i.e. all possible values of the k−1 partial licenses are equally likely and thus the formal license is completely undetermined by anyone having k−1 partial licenses.

Figure 5:
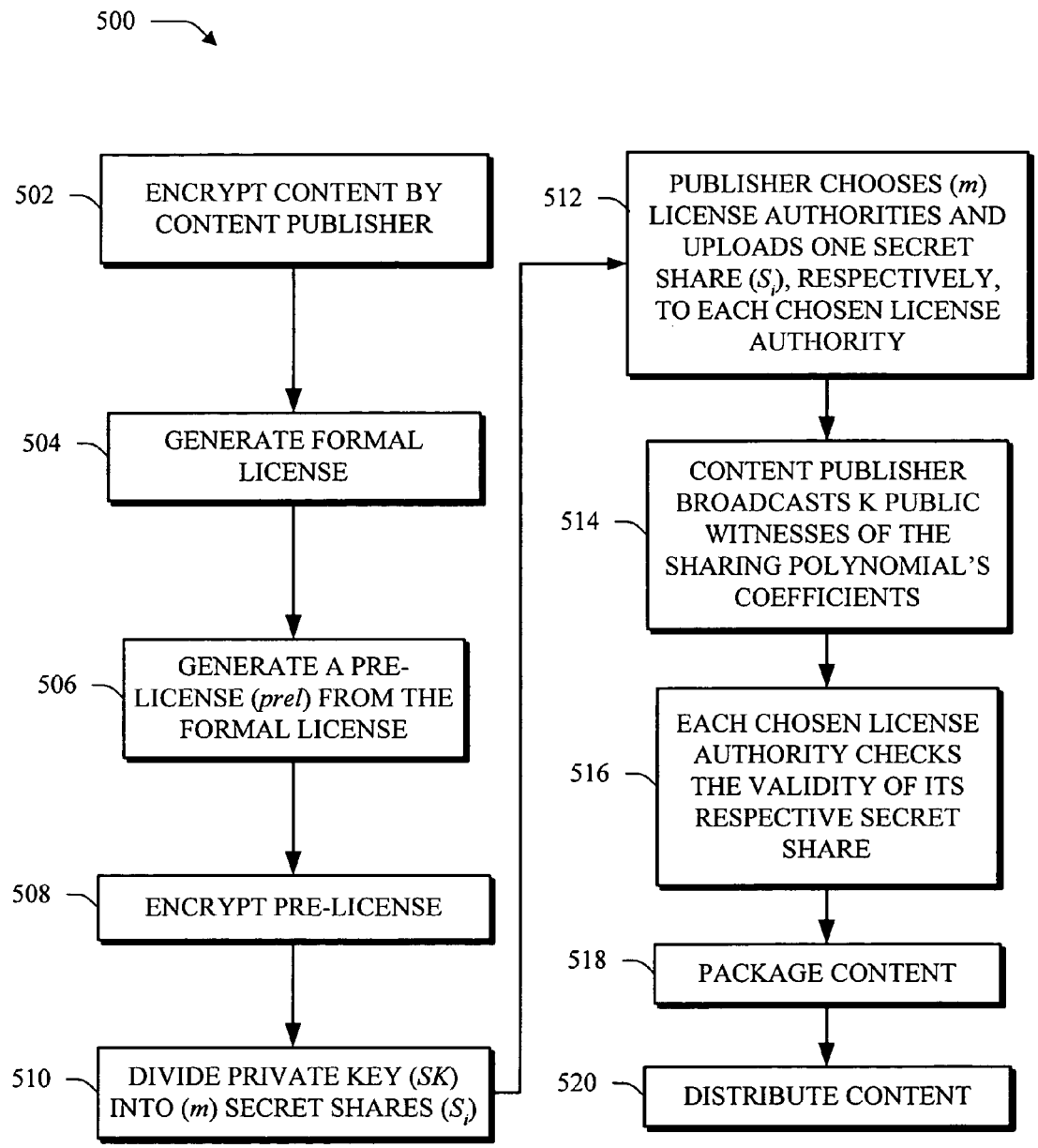
FIG. 5 is a flow chart illustrating a procedure of an exemplary implementation in which a DRM system employs a (k, m) threshold secret sharing scheme such that a plurality of license authorities are configured to provide partial licenses which may be utilized to form a formal license.

FIG. 5 is a flow chart illustrating a procedure 500 of an exemplary implementation in which a DRM system employs a (k, m) threshold secret sharing scheme such that a plurality of license authorities are configured to provide partial licenses which may be utilized to form a formal license. The digital rights management system of the present implementation may include the content publisher and the plurality of license authorities shown in FIG. 1. At block 502, content is encrypted by a content publisher. A variety of encryption algorithms may be employed to encrypt the content. An example of an encryption algorithm that may be utilized is the Advanced Encryption Standard (AES), which is a symmetric encryption algorithm. Symmetric encryption algorithms utilize a single key to encrypt and decrypt data.

At block 504, a formal license is generated for the content, which may be utilized by a consumer to play the encrypted content. The formal license contains a decryption key to unlock the encrypted content of block 502 and access rules that a consumer, i.e. the owner of the formal license, has to interact with the content. The access rules may include access rights for a particular consumer, such as a time period during which the content may be accessed, the manner in which the content may be accessed, and so on. The access rules may be expressed in the formal license utilizing a variety of languages, such as XRML (extensible Rights Markup Language), XACML (extensible Access Control Markup Language), ODRL (Open Digital Rights Language), and the like.

At block 506, a pre-license is generated from the formal license of block 504. The pre-license may contain the decryption key associated with the access rules that the content publisher allows. The pre-license will be used to generate the partial licenses, which are then utilized to form the formal license, as will be discussed in greater detail in relation to FIG. 6.

At block 508, for example, the pre-license, denoted as prel in the following equations, is generated from the formal license by utilizing an asymmetric encryption algorithm, a symmetric encryption algorithm, and so on. Asymmetric encryption algorithms are utilized in public-key cryptography. Public-key cryptography employs a pair of "keys" which are referred to as a private key and a public key. Public-key cryptography uses either the public or private key at different steps of the encryption and decryption process. For example, public-key cryptography may utilize an asymmetric encryption algorithm to encrypt data and an asymmetric decryption algorithm to decrypt encrypted data. The asymmetric encryption algorithm uses the public key and original data to be encrypted to form the encrypted data, e.g. cipher text. The asymmetric decryption algorithm uses the private key in conjunction with the encrypted data to generate the original data. In an additional implementation that symmetric encryption algorithm is used to generate the pre-license, a single key is used for both encryption and decryption. An example of an asymmetric encryption and decryption is known by the acronym "RSA" (Rivest, Shamir, & Adleman). In Equation (1), which is shown below, the formal license is encrypted using a public key to generate a pre-license. The formal license, the pre-license, and the public key are denoted, respectively, as "license", "prel" and "PK" in Equation (1).

$$prel = (license)^{pk} \quad (1)$$

At block 510, the corresponding "secret" private key, denoted as SK, is divided into m shares using a (k, m) threshold secret sharing scheme in which the private key SK is divided into m partial secret shares, any k of which are combinable to generate the secret. For example, a sharing polynomial f(x) may be generated, which is shown as Equation (2) as follows:

$$f(x) = a_0 + a_1 x + \ldots + a_{k-1} x^{k-1} \quad (2)$$

The content publisher generates the sharing polynomial f(x) where $a_0 = SK$. Although polynomial interpolation is described, other collections of functions may also be utilized. Each partial secret share $S_i$ may then be calculated using Equation (3), which is shown as follows:

$$S_i = f(id_i) \bmod \phi(N) \quad (3)$$

where N is a RSA modulus and $\phi(N)$ is a Euler totient function.

At block 512, the content publisher chooses m license authorities, identified in the following equations by $id_i$, in which $i = 1, \ldots, m$, and uploads one of the partial secret shares, denoted as $S_i$, to each chosen license authority, along with the pre-license prel generated at block 508 and a license ID. The license ID may be utilized to locate the partial secret share and the pre-license. For example, the license authority may be configured to provide a plurality of partial licenses to generate different respective licenses. Therefore, the license authority may identify a particular partial license based on the license ID. Although uploading each one of the partial secret shares to a different license authority is described (e.g., the number of partial secret shares equals the number of license authorities), a variety of distribution schemes may be employed to choose license authorities. For instance, more than one secret share may be uploaded to a single license authority, more than m license authorities may be chosen to promote redundancy, and so on as will be discussed in greater detail in relation to FIG. 7.

To promote the integrity of the DRM system, and particularly the partial secret shares that are received by each of the license authorities, a verifiable secret sharing (VSS) scheme may also be utilized in conjunction with the (k, m) threshold secret sharing scheme. For example, the VSS scheme may enable each license authority that receives a partial secret share to verify the validity of the received partial secret share, an example of which is shown at blocks 514 and 516.

At block 514, for instance, the content publisher may broadcast k public witnesses of the sharing polynomial's coefficients, which are denoted as $\{g^{a_0}, \ldots, g^{a_{k-1}}\}$, where $g \in Z^*_N$. After broadcast, the content publisher may destroy the polynomial. At block 516, each license authority $id_i$ verifies validity of the received partial secret share. Validity may be checked by determining if Equation (4), as shown below, holds for the received partial secret share $S_i$ utilizing the sharing polynomial's coefficients which were broadcast at block 514:

$$g^{S_i} = g^{a_0} \cdot (g^{a_1})^{id_i} \cdot \ldots \cdot (g^{a_{k-1}})^{id_i^{k-1}} \bmod N \quad (4)$$

In this way, each license authority $id_i$, may verify the validity of the received partial secret share $S_i$ without exposing or knowing the secret, i.e. the private key SK.

At block 518, the encrypted content from block 502 is packaged. The packaged content includes the addresses of the chosen license authorities which store the partial secret shares, the pre-license, and the license ID. By providing the addresses of the chosen license authorities in the encrypted content, a content player, when executed on a client device, may locate the chosen license authorities to form the formal license of block 504 to access the content. An example of forming the formal license through execution of the content player is discussed in relation to FIG. 6.

At block 520, the packaged content is distributed. The packaged content may be distributed in a variety of ways. For example, the packaged content may be stored on a computer readable medium that is sold to consumers, may be made available over the network shown in FIG. 1, and so on. In a peer-to-peer network, for example, the content publisher 102 may transmit the packaged content onto the peer-to-peer network 106 of FIG. 1. The packaged content is replicated by the nodes of the network 106 to provide the content to consumers, i.e. client devices, other content publishers, and so on. A consumer may use a search mechanism provided in the network 106 to locate and retrieve the desired content.

Figure 6:
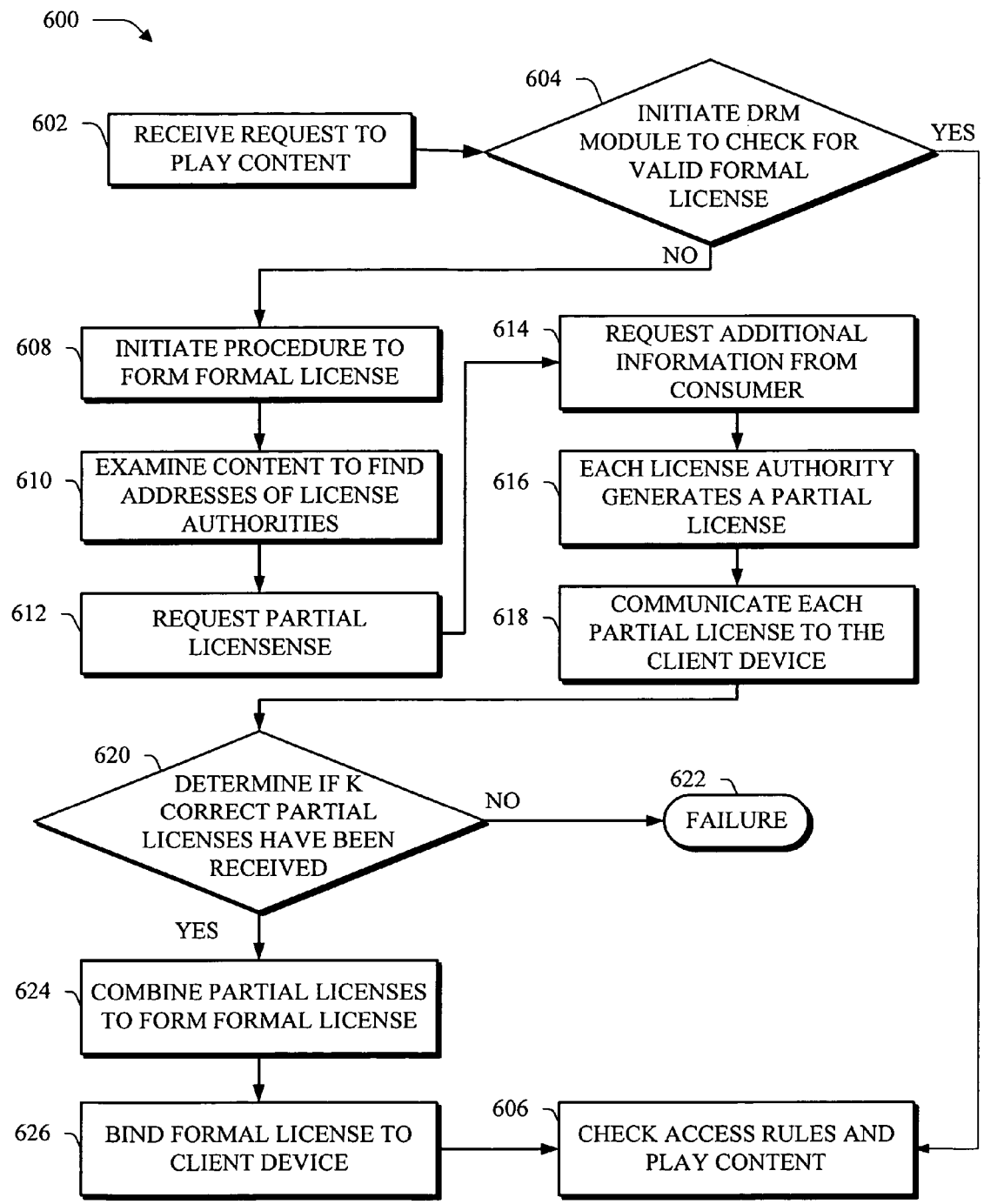
FIG. 6 is a flow chart of a procedure in an exemplary implementation in which a formal license of FIG. 5 is formed by a client device to play the content.

FIG. 6 is a flow chart of a procedure 600 in an exemplary implementation in which a formal license is formed by a client device to play the content of FIG. 5. At block 602, a request is received to play content by a content player. The request, for example, may be provided by a user through execution of the content player 122 of FIG. 2. Upon receipt of the request, at block 604, the DRM module is initiated by the content player to check for a valid formal license for the requested content. As previously stated, the formal license is provided to enable the content player to output the content. If a valid formal license is available, then at block 606 the DRM module checks the access rules and plays the content. If a valid formal license is not available, then at block 608 the DRM module initiates a procedure to form the formal license.

At block 610, the DRM module examines the content to find addresses of the license authorities for the content. For example, as was discussed in relation to block 518 of FIG. 5, the content may be packaged to include addresses of license authorities that are capable of generating partial licenses. A node p of the network where the content player is executed, e.g. the client device, retrieves a list of the addresses of the license authorities. The list of license authorities identifies which nodes of the network are configured as license authorities that are capable of providing one or more partial licenses that may be utilized by the content player to form the formal license for the requested content.

At block 612, the client device, through execution of the DRM module, requests partial licenses from at least a subset of the license authorities such that k partial licenses will be provided. For example, the addresses included in the content may provide a list of license authorities that provide more partial licenses, e.g. k+1, than are needed to form the formal license. Therefore, the DRM module may communicate requests to license authorities such that k partial licenses will be obtained. In another implementation, the DRM module may communicate a request to each license authority that is identified in the packaged content. Therefore, if one of the license authorities is not successful in providing a corresponding partial license, the k number of partial licenses may still be obtained from other license authorities, as will be described in greater detail in relation to FIG. 7.

At block 614, one or more of the contacted license authorities may request addition information from the consumer. For example, the consumer may be asked for information for registration purposes, payment information, and so on. Payment information, for instance, may be processed by one or more of the license authorities in order to grant access to the content. Once the payment information is processed, the license authorities may generate the partial licenses that are used to form the formal license to access the content. Thus, the license authorities may provide processing of payment information before enabling formation of the formal license.

At block 616, each of the license authorities generates a partial license which is a result of the partial secret share and the preliminary license that was uploaded to the license authorities at block 512 of FIG. 5. By generating the partial license, the pre-license and the partial secret share are not revealed, thereby promoting the security of the DRM system. For example, each partial license may be utilized to complete the formal license. After k partial licenses have been received, the formal license may be formed without any of the license authorities learning of the other partial secrets. Thus, the secrecy of the private key SK may be maintained and reused.

Each license authority $id_i$, for instance, may calculate the partial license $prel_i$ from its respective partial secret share $S_i$ and the pre-license prel using Equation (5), which is shown as follows:

$$prel_i = (prel)^{S_i} \bmod N \qquad (5)$$

To enable the client device to verify the partial secret share, a random number u is generated and used to calculate $A_1 = g^u$, $A_2 = prel^u$, $r = u - c*S_i$, and Equation (6):

$$c = \text{hash}(g^{S_i}, prel_i, A_1, A_2) \qquad (6)$$

At block 618, each license authority responds by communicating the partial license $prel_i$, $A_1$, $A_2$, and r securely to the requesting node p, i.e. the client device.

At block 620, the content player, when executed by the client device, determines if k correct partial licenses have been received by validating each of the partial licenses. The partial licenses may be validated as follows. First, node p calculates $$g^{S_i} = g^{a_0} \cdot (g^{a_1})^{id_i} \cdot \ldots \cdot (g^{a_{k-1}})^{id_i^{k-1}} \bmod N \qquad (7)$$

from the public witnesses of the sharing polynomial's coefficients, as was described in relation to block 516 of FIG. 5 and Equation (4). Equation (6) is then applied to $g^{S_i}$ and the received partial license $prel_i$, $A_1$, and $A_2$ to calculate c. The received partial license $prel_i$ is verified by checking if the following equations hold: $g^r \cdot (g^{S_i})^c = A_1$ and $prel^r \cdot (prel_i)^c = A_2$. The above steps are repeated until the node p obtains k valid partial licenses. If k valid partial licenses cannot be obtained, generation of the formal-license fails (block 622).

If k valid partial licenses are obtained, then at block 624, the content player combines the partial licenses to form the formal license. For example, the node p uses the k valid partial results to calculate the formal license utilizing Equation (8):

$$\text{license} = \prod_i (prel_i)^{l_{id_i}(0)} = (prel)^{\sum_i S_i \cdot l_{id_i}(0)} \qquad (8)$$

$$= (prel)^{SK} = ((license)^{PK})^{SK} \bmod N,$$

$$\text{where } l_{id_i}(x) = \prod_{j=1, j \neq i}^{k} \frac{x - id_j}{id_i - id_j}.$$

At block 626, the formal license is bound to the client device that is executing the content player. For example, the formal license may be encrypted with a key that is related to the specific hardware of the node p that generated the formal license, such as a globally unique identifier (GUID) of a network access card. Thus, the formal license is an individualized license that can be used only by the node p, i.e. the client device. The formal-license may be stored in the client device for future access, such that the formal license is not generated each time the content is to be output by the content player. At block 606, the DRM module checks the access rules in the formal license and plays the content.

Although in this implementation, the formal license was described as being formed by the DRM module inside the content player, the formal license may also be generated by a dedicated module, such as the DRM module 216 shown in relation to FIGS. 2-4. For example, the steps performed by the client device may be performed by a "black-box" DRM module which is inside of and/or coupled to the content player. The "black-box" DRM module may be secure and tamper-proof such that although the content player may interact with the DRM module, neither the content player nor other software modules of the client device may change the DRM module.

The formal license formed from the partial licenses by the client device may also be client specific such that access rules are modified to reflect different access rights of different consumers. A content publisher, for example, may generate a formal license at block 504 of FIG. 5 that describes various options that are supported for accessing the content, such as different periods of time for output of content having corresponding payment schedules. At block 614 of FIG. 6, the license authorities may request additional information from the consumer, such as to choose the desired output duration. In response, the consumer may provide payment information and choose a desired option. The content publisher then configures the partial licenses to provide a formal license which reflects the choice. Thus, the formal license generated by the content provider may act as a template for forming a client-specific formal license.

Figure 7:
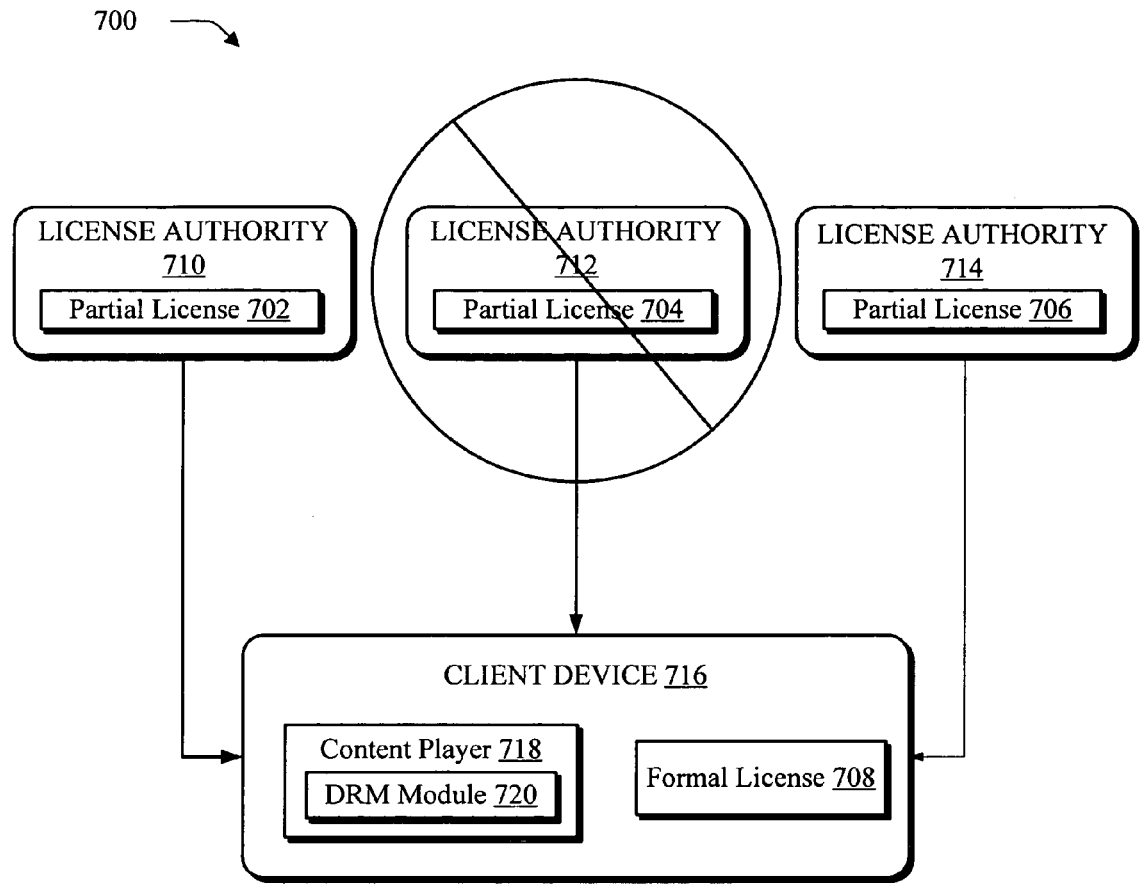
FIG. 7 is an illustration of a process flow of an exemplary implementation showing redundancy in a DRM system using a (k, m) threshold secret sharing scheme to provide partial licenses which are used to form a formal license.

FIG. 7 is an illustration of an exemplary implementation showing redundancy in a DRM system 700 using a (k, m) threshold secret sharing scheme to provide partial licenses which are used to generate a formal license. By providing for distributed generation of partial licenses in the DRM system in which any collection of k partial licenses may be utilized to form the formal license, a variety of functionality may be provided by the DRM system 700.

The (k, m) threshold secret sharing scheme may provide redundancy in case one or more license authorities become unavailable by distributing the generation of the partial licenses. For example, a partial license may be provided in a (2, 3) threshold secret sharing scheme in which any two partial licenses of a set of three partial licenses 702, 704, 706 are sufficient to form a formal license 708. Each of the partial licenses 702, 704, 706 may be generated on a respective one of a plurality of license authorities 710, 712, 714. As previously described, a client device 716 may receive a request to output content through a content player 718, and therefore execute a DRM module 720 to form the formal license 708. The client device 716 requests the partial licenses 702, 704, 706 from the respective license authorities 710, 712, 714.

License authority 712, however, may be unavailable to provide its respective partial license 704, such as due to software error, hardware error, and/or network error. Even though partial license 704 is unavailable to the client device 716, the client device 716 may form the formal license 708 from partial licenses 702, 706 which were generated, respectively, by license authorities 710, 714. Thus, the DRM system 700 may distribute generation of k+1 partial licenses to provide redundancy for formation of the formal license 708.

The (k, m) threshold secret sharing scheme may also provide security against attack by distributing the generation of the partial licenses. When employing the (k, m) threshold secret sharing scheme, knowledge of k−1 partial licenses is not sufficient to form the formal license. Therefore, the DRM system 700, when employing a (k, m) threshold secret sharing scheme, may further protect against unauthorized use of content. For example, suppose an attacker of the DRM system 700 obtains k−1 partial licenses. The k−1 partial licenses, even when combined, do not reveal any of the information included in the formal license. Therefore, an attacker must compromise a sufficient number of license authorities to obtain k partial licenses. To further improve security, an update scheme may be employed which is described in greater detail in relation to FIG. 8.

The (k, m) threshold secret sharing scheme may also provide for various distributions of the provision of partial licenses. For example, collections of partial licenses, e.g. tuples, may be arranged in the DRM system based on a variety of considerations, such as security, load sharing, network availability, available hardware and/or software resources, and so on. An ability to generate two partial licenses, for instance, may be given to a first license authority that is reliable and/or that has considerable security safeguards, while an ability to generate a single partial license may be provided to a second license authority that does not have security safeguards that are as extensive as the first license authority. In this way, generation of partial licenses by the license authorities may be arranged in the DRM system based on the level of security provided by each of the license authorities, respectively.

Further, partial licenses may be changed without changing the formal license. For instance, a new polynomial $f_{new}(x)$ may be utilized with the same free term. A frequent change of this type may enhance security because partial licenses that are obtained from a breach in security cannot be combined unless all of the partial licenses are values of a same edition of the f(x) polynomial, i.e. $f_{new}(x)$, as will described in greater detail in relation to FIG. 8.

Figure 8:
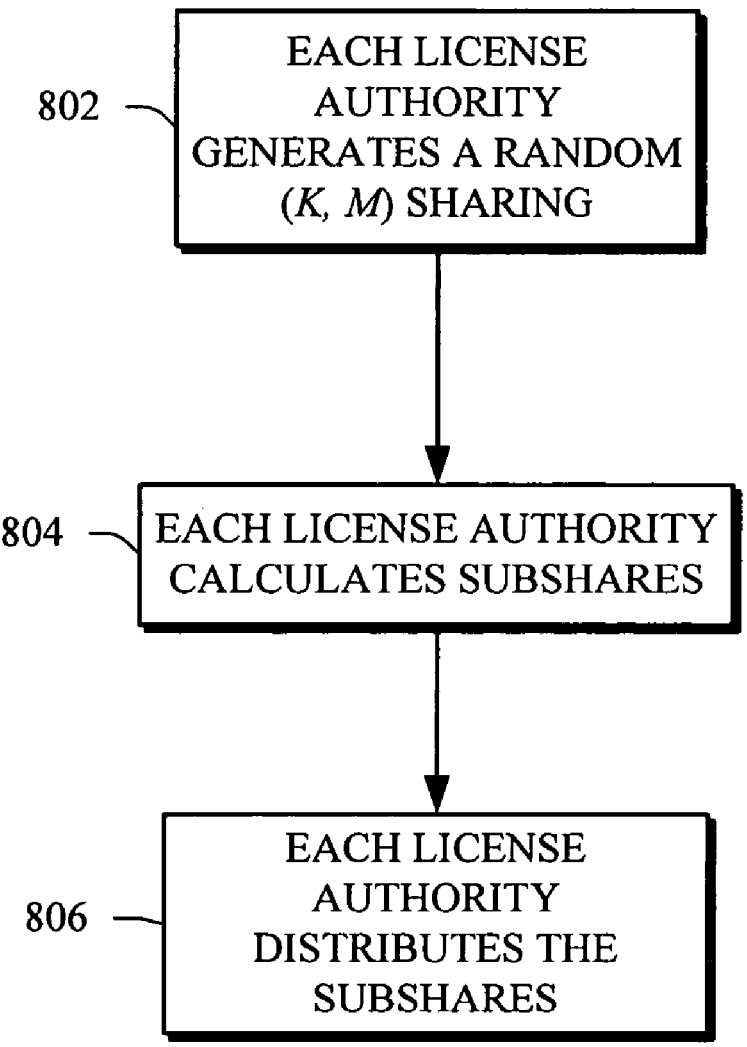
FIG. 8 is a flow diagram illustrating a procedure of an exemplary implementation in which an update scheme is utilized in a DRM system employing a (k, m) threshold secret sharing scheme.

FIG. 8 is a flow diagram illustrating a procedure 800 of an exemplary implementation in which an update scheme is utilized in a DRM system employing a (k, m) threshold secret sharing scheme. In the secret sharing schemes described in the previous implementations, the secret is protected by distributing partial secret shares among license authorities. Given sufficiently long time, however, an attacker may finally compromise k partial secret shares to deduce the "secret", i.e. the private key SK. To thwart such an attack, the partial secret shares may be updated periodically with a proactive secret sharing scheme. An attacker, therefore, has to compromise k partial secrets before the partial secrets are updated. Otherwise the attacker is forced to restart the attacks again. A variety of proactive secret share update algorithms may be utilized to create a configuration of license authorities with a new version of the secret shares.

At periodic intervals, for example, the license authorities may update their respective shares of the private key SK through execution of the respective update module 222 of FIG. 2. At block 802, each license authority i generates a random (k, m) sharing of the secret 0 using a random update polynomial $f_{i, update}(X)$, as shown in Equation (9):

$$f_{i,update}(x) = b_{i,1}x + \ldots + b_{i,k-1}x^{k-1} \qquad (9)$$

At block 804, each license authority i calculates subshares $S_{i,j} = f_{i,update}(j), j=1, \ldots, m$.

At block 806, each LA i distributes the subshares $S_{ij}$ to license authorities j, where j=1, . . . , m. Therefore, each license authority i has m subshares $S_{ij}$ where j=1, . . . , m. The subshares may be added to the original share $S_i$, and the result is a new updated share, as shown in Equation (10):

$$S_i' = S_i + \sum_{j=1}^{m} S_{j,i}. \qquad (10)$$

The corresponding new secret sharing polynomial $f_{new}(x)$ is the summation of the original polynomial f(x) and each of the randomly generated polynomials $f_{i,update}(x)$. As is in the following proof, $S'_i$ is the partial secret share generated from $f_{new}(x)$.

Proof:

$$f_{new}(x) \equiv f(x) + \sum_{j=1}^{m} f_{j,update}(x) =$$

$$a_0 + \left(a_1 + \sum_{j=1}^{m} b_{j,1}\right)x + \ldots + \left(a_{k-1} + \sum_{j=1}^{m} b_{j,k-1}\right)x$$

$$S'_i = S_i + \sum_{j=1}^{m} S_{i,j} = f(i) + \sum_{j=1}^{m} f_{j,update}(i) = f_{new}(i).$$

Figure 9:
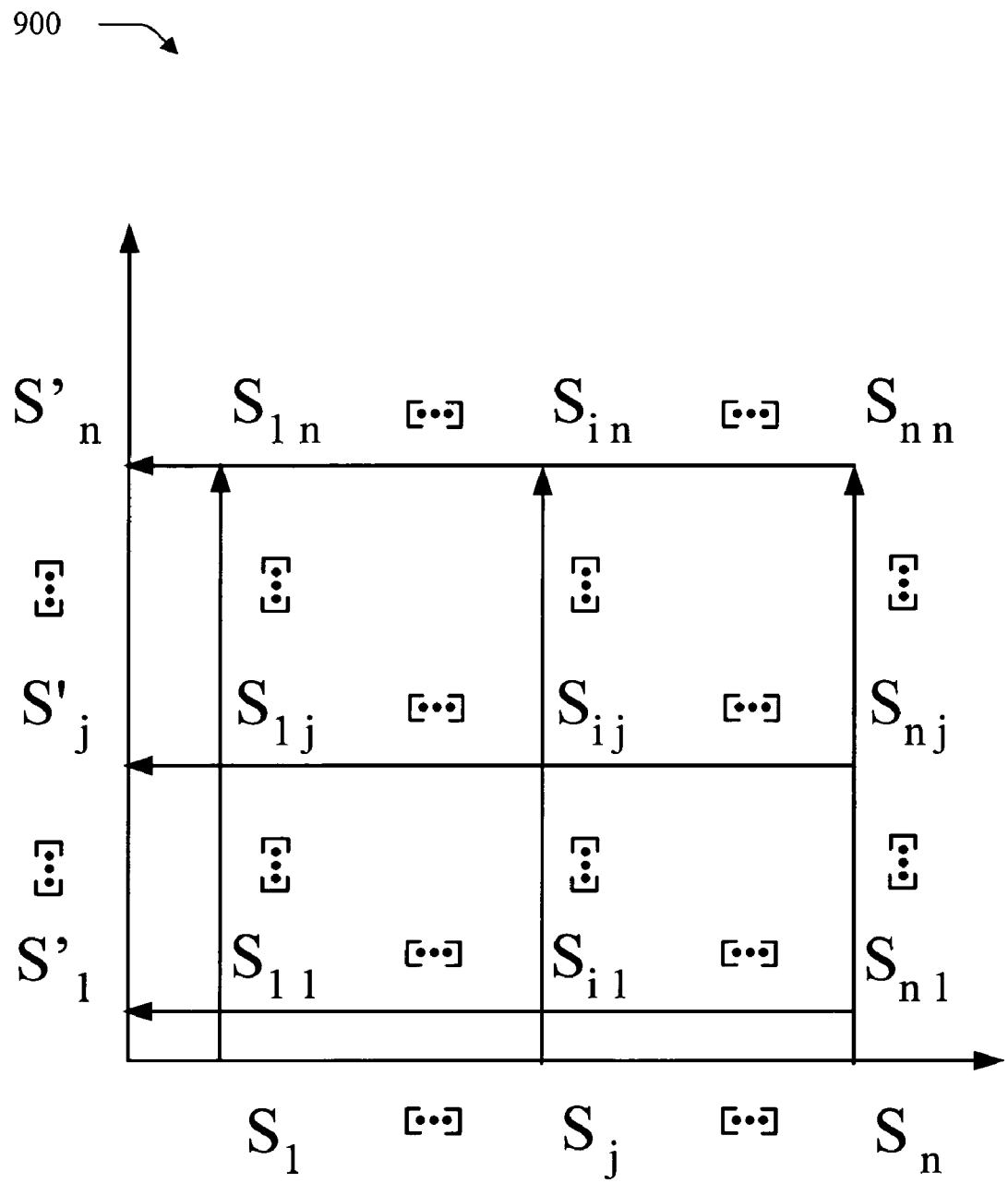
FIG. 9 is an illustration depicting an exemplary updating scheme in which subshares of partial secret shares are generated.

An example of an exemplary updating scheme 900 is shown in FIG. 9, in which partial secrets are updated by the use of subshares. Although execution of an update module 222 of FIG. 2 on each license authority has been described, a centralized update module may also be utilized. For example, update module 220 may be executed by content publisher 102 of FIG. 2 to update how the partial licenses are provided by each of the license authorities 108(h) of FIG. 1.

CONCLUSION

A Public License Infrastructure (PLI) and license authorities have been discussed which may be used to build a distributed DRM license service system. Based on the PLI and the license authorities, a distributed DRM system has been described which may be utilized in peer-to-peer networks. The described DRM system may utilize a (k, m) threshold secret sharing scheme, a verifiable secret sharing scheme, and a proactive share update scheme. The threshold secret sharing scheme and the PLI make the DRM system intrusion-tolerant, fault-tolerant, flexible, scalable, reliable, and highly available. As such, through utilization of a plurality of license authorities, complex and centralized license servers in a conventional DRM system are no longer needed.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   generating, at a content publisher configured to provide digital rights management, a formal license for content that includes:
   a decryption key for decrypting the content; and
   access rules for accessing the content; and
   configuring a plurality of license authorities to provide a plurality of partial licenses, wherein:
   each said license authority provides a respective said partial license; and
   the plurality of partial licenses are combinable to form the formal license;
   wherein the configuring includes:
   generating, at the content publisher, a pre-license from the formal license by encrypting the formal license utilizing an asymmetric encryption algorithm having a public key and a private key, wherein the formal license, the pre-license and the public key are denoted, respectively, as "license", "prel" and "PK" as follows:

$prel = (license)pk;$ dividing the private key SK into m partial secret shares according to a (k, m) threshold secret sharing scheme by generating a sharing polynomial f(x) being represented as follows:

$f(x) = ao + a1x + \ldots + ak-1xk-1$, where $ao = SK$, and
   transmitting the pre-license and a respective said partial secret share from the content publisher to a respective said license authority, wherein each said license authority is configured to generate the respective said partial license from the respective said partial secret share and the pre-license, and wherein each said license authority is configured to verify the pre-license and the respective said partial secret share by utilizing a verifiable secret sharing (VSS) scheme in which k public witnesses of the sharing polynomial's f(x) coefficients (denoted as $\{g^{a_0}, \ldots, g^{a_{k-1}}\}$, where $g \in Z_N$) are communicated to each said license authority $id_i$ to verify validity of a respective said partial secret share $S_i$ by determining if the following equation holds:

$g^{S_i} = g^{a_0} \cdot (g^{a_1})^{id_i} \cdot \ldots \cdot (g^{a_{k-1}})^{id_i^{k-1}} \mod N.$ 2. A method as described in claim 1, wherein the plurality of partial licenses is provided according to a (k, m) threshold secret sharing scheme in which:
   a number k said partial licenses are combinable to form the formal license; and
   knowledge of any k−1 or fewer said partial licenses may not be utilized to form information included in the formal license.

3. A method as described in claim 1, further comprising packaging the content to include one or more network addresses that are suitable for locating each said license authority.

4. A method as described in claim 1, wherein each said license authority is communicatively coupled to a peer-to-peer network.

5. A method as described in claim 1, wherein the plurality of license authorities are configured based on a consideration such that at least one said license authority provides two or more said partial licenses, wherein the consideration is selected from the group consisting of:
   security of the at least one said license authority against unauthorized access;
   load sharing of the plurality of license authorities;
   availability of each said license authority;
   network availability of each said license authority;
   hardware resources of each said license authority;
   software resources of each said license authority; and
   any combination thereof.

6. One or more computer-readable media comprising computer-executable instructions that, when executed, perform the method as recited in claim 1.

7. A method comprising:
   obtaining a plurality of partial licenses over a network at a client device executing a content player from a plurality of license authorities, wherein each said partial license is provided, respectively, by a different said license authority; and forming a formal license from the plurality of partial licenses at the client device, wherein the formal license includes access rules and a decryption key for accessing content, wherein:

the plurality of partial licenses are obtained from the plurality of license authorities at the client device by:

calculating the partial license preli by each said license authority idi from a partial secret share Si and a pre-license prel according to the following equation:

$$prel_i = (prel)^{S_i} \bmod N;$$

generating a random number u to calculate A1=gu, A2=prelu, r=u−c*Si, and $$c = hash(g^{S_i}, prel_i, A_1, A_2); \text{ and}$$

communicating the partial license preli, A1, A2, and r by each said license authority; and the formal license is formed from the plurality of partial licenses at the client device by:

determining if k correct partial licenses have been received by validating each said partial license preli by:

calculating $$g^{S_i} = g^{a_0} \cdot (g^{a_1})^{id_i} \cdot \ldots \cdot (g^{a_{k-1}})^{id_i^{k-1}} \bmod N$$

from public witnesses of a sharing polynomial's coefficients, which are denoted as $\{g^{a_0}, \ldots, g^{a_{k-1}}\}$, that was utilized to generate the partial secret share Si, where $g \in Z_N$, applying $c = hash(g^{S_i}, prel_i, A_1, A_2)$ to calculate c; and checking if $g^r \cdot (g^{S_i})^c = A_1$ and $Prel^r \cdot (prel_i)^c = A_2$ hold for each said partial license preli, and if so, each said partial license preli is valid; and combining the plurality of partial licenses to form the formal license at the client device, denoted as license, when k valid said partial licenses are obtained, in which:

$$license = \prod_i (prel_i)^{l_{id_i}(0)} = (prel)^{\sum_i S_i \cdot l_{id_i}(0)}$$

$$= (prel)^{SK} = ((license)^{PK})^{SK} \bmod N,$$

where $l_{id_i}(x) = \prod_{j=1, j \neq i}^{k} \frac{x - id_j}{id_i - id_j}.$

8. A method as described in claim 7, wherein the obtaining includes:

examining the content to find a plurality of network addresses of a plurality of license authorities;

requesting the plurality of partial licenses from the plurality of license authorities; and receiving one or more communications having one or more said partial licenses that are provided by each said license authority.

9. A method as described in claim 7, wherein the forming includes combining the plurality of partial licenses to form the formal license.

10. One or more computer-readable media comprising computer-executable instructions that, when executed, perform the method as recited in claim 7.

11. A method comprising:

configuring, at a content publisher configured to provide digital rights management, a plurality of license authorities in a first arrangement to provide a plurality of partial licenses, wherein:

each said license authority provides at least one said partial license; and the plurality of partial licenses are combinable to form a formal license that includes access rules and a decryption key for content; and updating, at the content publisher, the first arrangement to form a second arrangement such that:

each said license authority in the second arrangement provides at least one of a plurality of updated partial licenses that are combinable to form the formal license; and the partial licenses provided in the first arrangement are not combinable with the updated partial licenses to form the formal license;

wherein the updating is performed by:

generating a random (k, m) sharing by each license authority i using a random update polynomial fi, update(x), wherein:

$$f_{i,update}(x) = b_{i,1}x + \ldots + b_{i,k-1}x^{k-1};$$

and distributing a subshare Si,j by each said license authority i such that each said license authority i has a respective said subshare Si,j from another said license authority wherein:

the subshare $S_{i,j} = f_{i,update}(j)$, j=1, ..., m is calculated by each said license authority i;

the subshare Si,j is added to the original share $S_i$ of each said license authority to form a new updated share $$S'_i = S_i + \sum_{j=1}^{m} S_{j,i};$$

and a new secret sharing polynomial fnew(x) is formed which is a summation of an original polynomial f(x) utilized to generate the plurality of partial licenses in the first arrangement and each of the randomly generated polynomials fi,update(x).

12. A method as described in claim 11, wherein the updating is performed periodically.

13. A client device comprising:

a processor; and memory configured to maintain:

packaged content that includes one or more network addresses that are suitable for locating a plurality of license authorities, wherein each said license authority stores one or more partial licenses;

a content player that is executable on the processor to output content; and a digital rights management module that is executable on the processor to:

obtain the partial licenses from the plurality of license authorities utilizing the one or more network addresses; and form a formal license from the obtained partial licenses, wherein the formal license provides access to the packaged content for output by the content player;

obtain the partial licenses from the plurality of license authorities, wherein each said license authority provide a respective said partial license by:

calculating the partial license preli by each said license authority idi from a partial secret share Si and a pre-license prel according to the following equation:

$prel_i = (prel)^{S_i} \mod N;$ generating a random number u to calculate $A1=g^u$, $A2=prel^u$, $r=u-c*S_i$, and $c = \text{hash}(g^{S_i}, prel_i, A_1, A_2);$ and communicating the partial license preli, A1, A2, and r by each said license authority; and the formal license is formed from the plurality of partial licenses by:

determining if k correct partial licenses have been received by validating each said partial license preli by:

calculating $g^{S_i} = g^{a_0} \cdot (g^{a_1})^{id_i} \cdot \ldots \cdot (g^{a_{k-1}})^{id_i^{k-1}} \mod N$ from public witnesses of a sharing polynomial's coefficients, which are denoted as $\{g^{a_0}, \ldots, g^{a_{k-1}}\}$, that was utilized to generate the partial secret share Si, where $g \in Z_N$, applying $c = \text{hash}(g^{S_i}, pre_i, A_1, A_2)$ to calculate c; and checking if $g^r \cdot (g^{S_i})^c = A_1$ and $prel^r \cdot (prel_i)^c = A_2$ hold for each said partial license preli, and if so, each said partial license preli is valid; and combining the plurality of partial licenses to form the formal license, denoted as license, when k valid said partial licenses are obtained, in which:

$$\text{license} = \prod_i (prel_i)^{l_{id_i}(0)} = (prel)^{\sum_i S_i \cdot l_{id_i}(0)}$$

$$= (prel)^{SK} = ((license)^{PK})^{SK} \mod N,$$

where $l_{id_i}(x) = \prod_{j=1, j \neq i}^{k} \frac{x - id_j}{id_i - id_j}.$

14. A client device as described in claim 13, wherein the one or more network addresses include a proxy address for locating a network address of each said license authority.

15. A client device as described in claim 13, wherein the one or more network addresses include a network address of each said license authority.

16. A method comprising:

receiving, at a license authority executing a license module, a formal license from a content publisher, the formal license including a decryption key and access rules relating to particular content, wherein the access rules specify a plurality of time durations to access particular content based on respective payment amounts;

receiving a request at the license authority from a client device for a number of partial licenses related to the particular content;

sending a request from the license authority to the client device for additional information specifying an output duration to access the particular content;

generating the number of partial licenses at the license authority based on the formal license and a response received from the client device specifying the output duration, wherein the number of partial licenses generated at the license authority is based on security safeguards of the license authority relative to security safeguards of a plurality of additional license authorities; and sending the number of partial licenses to the client device.

17. A method comprising:

receiving content at a client device from a content publisher, wherein the client device is configured to execute a digital rights management module;

receiving a request to output the content at the client device;

determining, at the client device, if a valid formal license is available for the content at the client device, wherein the valid formal license is read to output the content, and wherein the valid formal license is comprised of a plurality of partial licenses, each partial license received from a plurality of license authorities;

obtaining, at the client device, a plurality of partial licenses from a plurality of license authorities when the valid formal license is not available at the client device, wherein the client device receives one partial license from a first number of the plurality of license authorities and the client device receives more than one license from second number of the plurality of license authorities; and combining the plurality of partial licenses at the client device to form the valid formal license.

* * * * *